(12) United States Patent
Huang et al.

(10) Patent No.: US 10,936,524 B2
(45) Date of Patent: Mar. 2, 2021

(54) BUS SYSTEM WITH SLAVE DEVICES

(71) Applicant: Nuvoton Technology Corporation, Hsinchu (TW)

(72) Inventors: Chih-Hung Huang, New Taipei (TW); Chun-Wei Chiu, New Taipei (TW); Hao-Yang Chang, Miaoli County (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 0 days.

(21) Appl. No.: 16/398,715

(22) Filed: Apr. 30, 2019

(65) Prior Publication Data

US 2019/0361833 A1      Nov. 28, 2019

(30) Foreign Application Priority Data

May 24, 2018    (TW) .................................. 10711772.7

(51) Int. Cl.
*G06F 13/40*         (2006.01)
(52) U.S. Cl.
CPC .. *G06F 13/4068* (2013.01); *G05B 2219/1215* (2013.01); *G05B 2219/2231* (2013.01); *G05B 2219/2233* (2013.01); *G05B 2219/2234* (2013.01)

(58) Field of Classification Search
CPC combination set(s) only.
See application file for complete search history.

(56) References Cited

U.S. PATENT DOCUMENTS

| 9,620,208 | B2 | 4/2017 | Lin et al. | |
|---|---|---|---|---|
| 2004/0093450 | A1* | 5/2004 | Andreas | G06F 13/4291 710/110 |
| 2005/0027920 | A1* | 2/2005 | Fitzsimmons | G06F 13/4022 710/317 |
| 2011/0029705 | A1* | 2/2011 | Evans | G06F 13/4291 710/110 |

(Continued)

FOREIGN PATENT DOCUMENTS

| CN | 101499046 A | 8/2009 |
|---|---|---|
| TW | I567561 B | 1/2017 |
| TW | 201712555 A | 4/2017 |

OTHER PUBLICATIONS

Taiwanese Office and Search Report Based on Appliction No. 107117727, dated May 17, 2019.

*Primary Examiner* — Raymond N Phan
(74) *Attorney, Agent, or Firm* — Muncy, Geissler, Olds & Lowe, P.C.

(57) ABSTRACT

A bus system is provided. The bus system includes a master device, a bus, and a plurality of slave devices electrically connected to the master device via the bus. Each slave device has an alert handshake pin. The alert handshake pins of the slave devices are electrically connected together via an alert-handshake control line. When a first slave device communicates with the master device through the bus, in a first phase of a plurality of phases in each assignment period, the first slave device sets the alert-handshake control line to a first voltage level via the alert handshake pin, wherein the first phase corresponds to the first slave device. In the phases other than the first phase in each assignment period, the alert-handshake control line is at a second voltage level. Each of the phases includes two clock cycles.

19 Claims, 6 Drawing Sheets

(56) References Cited

U.S. PATENT DOCUMENTS

| | | | |
|---|---|---|---|
| 2012/0072629 A1* | 3/2012 | Tokuda | G06F 13/364 |
| | | | 710/110 |
| 2015/0254198 A1* | 9/2015 | Anderson | G06F 13/364 |
| | | | 710/110 |
| 2017/0083467 A1* | 3/2017 | Mishra | G06F 13/4282 |
| 2017/0153997 A1* | 6/2017 | Chiu | G06F 13/1642 |

* cited by examiner

BUS SYSTEM WITH SLAVE DEVICES

CROSS REFERENCE TO RELATED APPLICATIONS

This Application claims priority of Taiwan Patent Application No. 107117727, filed on May 24, 2018, the entirety of which is incorporated by reference herein.

BACKGROUND OF THE INVENTION

Field of the Invention

The invention relates to a bus system, and more particularly to a bus system with a plurality of slave devices.

Description of the Related Art

In a conventional computer system, a chip set such as a south bridge chip is electrically connected to the other external circuit module (such as a system-on-a-chip (SoC) with various functions) through a low pin count (LPC) interface. The external circuit modules coupled through the LPC interface are assigned to different and independent addresses respectively. As a result, the south bridge chip can perform communication with the external circuit modules by a one-to-many way. However, in recent years, an aspect of the new bus architectures, such as an enhanced serial peripheral interface (eSPI) bus, began only allowing a one-to-one communication mechanism to be employed between the chip set and the external circuit modules.

Therefore, a scheme capable of scheduling a plurality of circuit modules of a bus is desirable.

BRIEF SUMMARY OF THE INVENTION

Bus systems are provided. An embodiment of a bus system is provided. The bus system includes a master device, a bus, and a plurality of slave devices electrically connected to the master device via the bus. Each slave device has an alert handshake pin. The alert handshake pins of the slave devices are electrically connected together via an alert-handshake control line. When a first slave device of the slave devices communicates with the master device through the bus, in a first phase of a plurality of phases in each assignment period, the first slave device sets the alert-handshake control line to a first voltage level via the alert handshake pin, wherein the first phase corresponds to the first slave device. In the phases other than the first phase in each assignment period, the alert-handshake control line is at a second voltage level. Each of the phases includes two clock cycles.

Furthermore, another embodiment of a bus system is provided. The bus system includes a master device, a bus, and a plurality of slave devices electrically connected to the master device via the bus. Each slave device has an alert handshake pin. The alert handshake pins of the slave devices are electrically connected together via an alert-handshake control line. Each of the slave devices detects the voltage level of the alert-handshake control line in a plurality of phases of each assignment period except for the corresponding phase, to determine whether the master device communicates with one of the slave devices. In the assignment period, the number of phases is equal to the number of slave devices.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
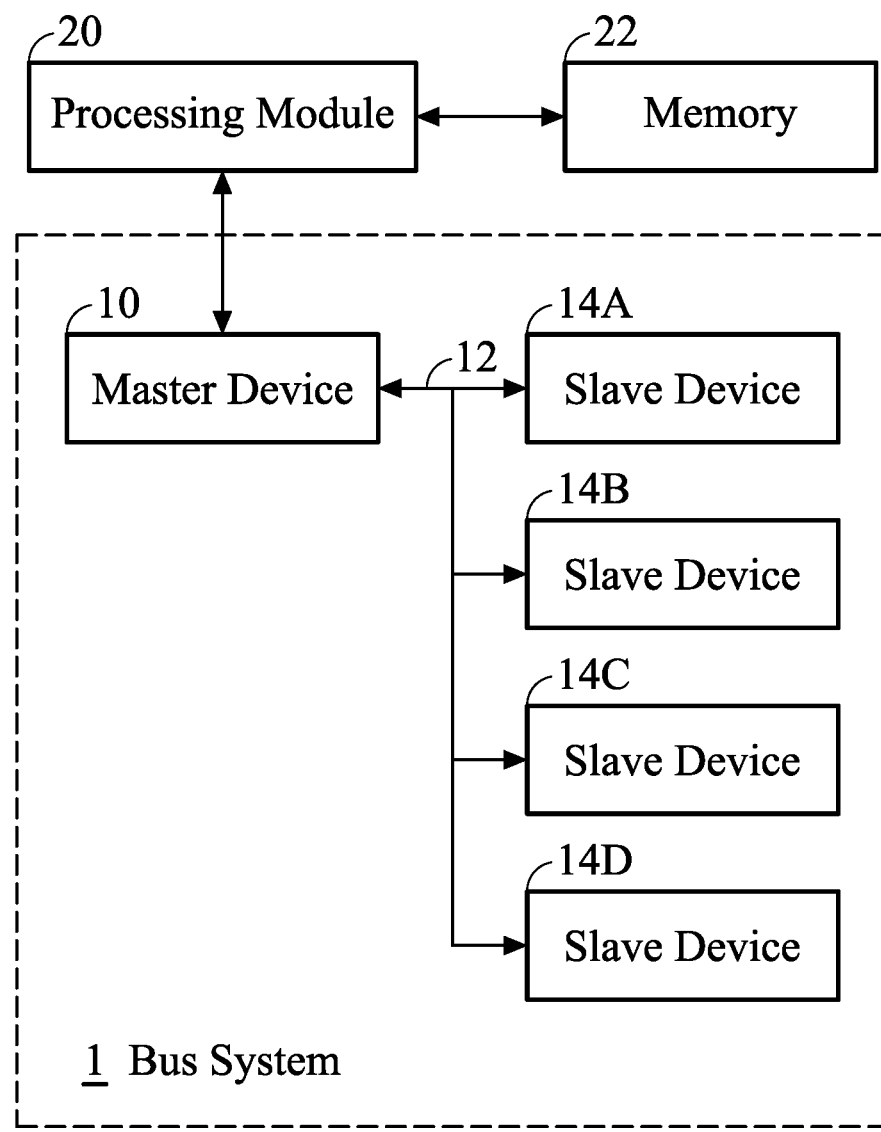
FIG. 1 shows a bus system according to an embodiment of the invention.

FIG. 1 shows a bus system 1 according to an embodiment of the invention. The bus system 1 includes a master device 10, a bus 12 and a plurality of slave devices 14A-14D. In some embodiments, the master device 10 may be a south bridge chip. In some embodiments, the master device 10 is electrically connected to a processing module 20 of a computer system (not shown), so as to perform data access with the slave devices 14A-14D through the bus 12 in response to the commands of the processing module 20. In some embodiments, the processing module 20 is electrically connected to a memory 22 of the computer system, so as to access the memory 22 according to the requests of different application programs. In some embodiments, the bus 12 is an enhanced serial peripheral interface (eSPI) bus. The master device 10 is electrically connected to the slave devices 14A-14D through the bus 12. Furthermore, the master device 10 can perform one-to-one communication only, and the slave devices 14A-14D can obtain the right to actively communicate with the master device 10 by using a handshake mechanism which is also called an arbitration mechanism. It should be noted that the number of slave devices 14A-14D as illustrated is used as an example, and not to limit the invention.

Figure 2:
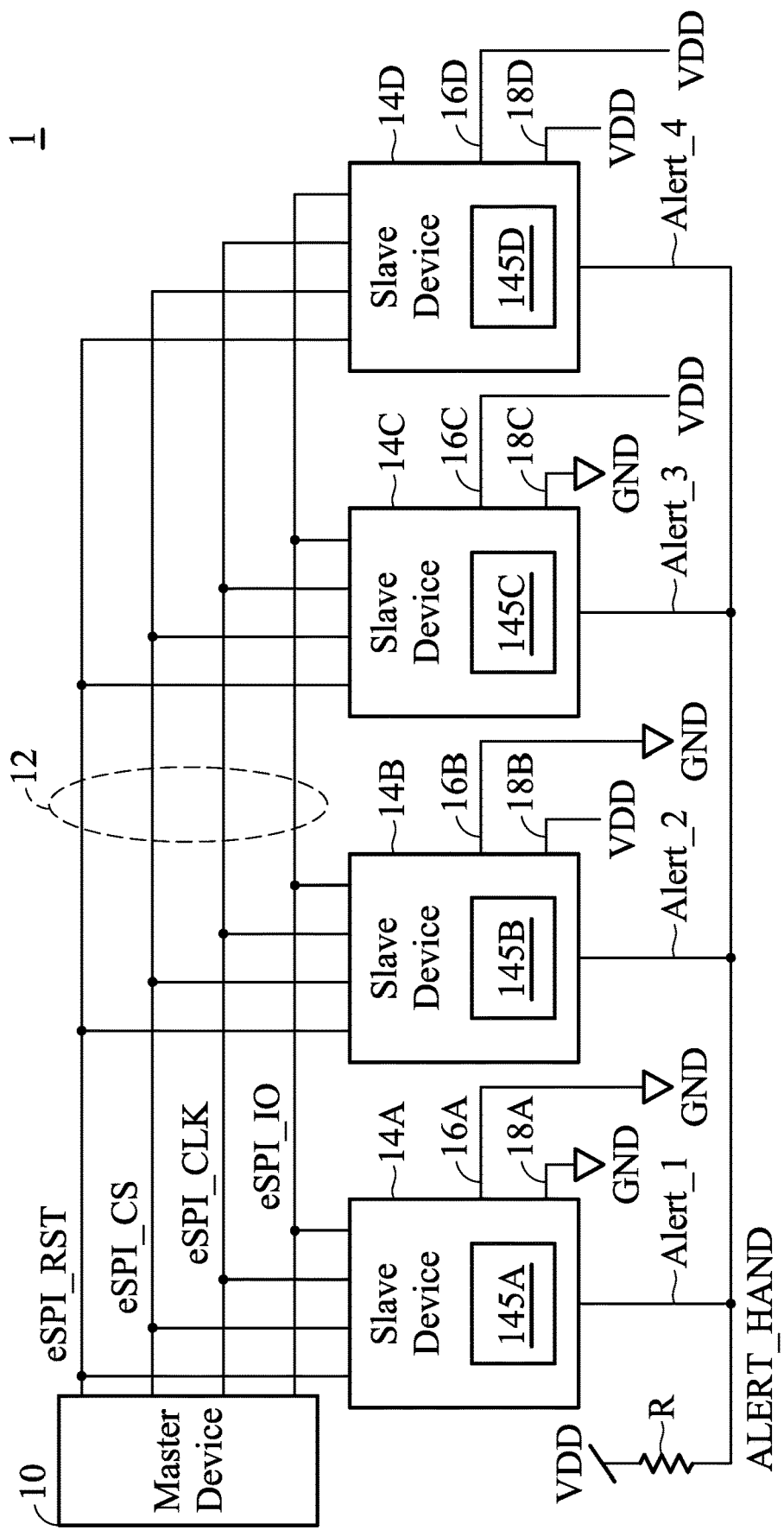
FIG. 2 shows the connection configuration of the bus system in FIG. 1 according to an embodiment of the invention.

FIG. 2 shows the connection configuration of the bus system 1 in FIG. 1 according to an embodiment of the invention. In the embodiment, the bus 12 includes a reset signal line eSPI_RST, a chip select signal line eSPI_CS, a clock signal eSPI_CLK and an input and output signal line eSPI_IO. The master device 10 has a chip select port connected to the chip select signal line eSPI_CS, and an IO port connected to the input and output signal line eSPI_IO. The master device 10 can trigger the chip select signal line eSPI_CS to start the one-to-one communication through the input and output signal line eSPI_IO. Furthermore, based on the handshake mechanism, one of the slave devices 14A-14D can actively communicate with the master device 10 (e.g., transmitting data and commands) through the input and output signal line eSPI_IO, and make the other slave device not respond to the master device 10. When the master device 10 communicates with the slave devices 14A-14D through the bus 12, the clock signal eSPI_CLK is used as a reference clock.

In general, according to the operation mechanism of the chip select signal line eSPI_CS, the master device 10 can only communicate with one slave device through the input and output signal line eSPI_IO. However, in the bus system 1, only one of the slave devices 14A-14D is able to respond to the master device 10 at a time slot based on the handshake mechanism. Therefore, even the master device 10 is connected to multiple slave devices through the bus 12, the master device 10 can still operate with a one-to-one communication mechanism, and the bus 12 can connect the slave devices 14A-14D to perform communication tasks in response to the chip select signal line eSPI_CS, thereby increasing the expandability of the bus system 1.

In an embodiment, the master device 10 can have only one chip select port, and the only one chip select port is connected to multiple slave devices through the single chip select signal line of the bus 12. In an embodiment, the master device 10 can have at least two chip select ports, and the at least two chip select ports are separately connected to different groups of slave devices through the at least two chip select signal lines of the bus 12. For example, the master device 10 can have a first chip select port and a second chip select port, and the first chip select port is connected to the first and second slave devices through a first chip select signal lines of the bus, and the second chip select port is connected to the third and fourth slave devices through a second chip select signal lines of the bus.

It should be noted that, in the bus system of the present invention, the master device does not have the information about the amount of the slave device connected thereto, so the master device is unable to perform communication by using the ID of one of the slave devices.

In an embodiment, the slave devices can comprise only one primary slave device and at least one secondary slave device, and the slave devices are assigned to have a plurality address sections different from each other. when the master device 10 triggers the chip select signal line eSPI_CS to start the one-to-one communication through the input output signal line eSPI_IO and none of the plurality of slave devices wants to actively communicate with the master device, the only one primary slave device is in charge of response to the master device 10. For example, when the bus system is initially activated, the only one primary slave device is in charge of response to the master device in an initial state, and after the initial state, any one of the slave devices is able to communicate with the master device.

In FIG. 2, the slave devices 14A-14D include the address section select pin 18A-18D, the address entry select pin 16A-16D and the alert handshake pins Alert_A-Alert_D. The addresses to which the slave devices 14A-14D correspond can be assigned according to a combination of the voltage levels received by the address section select pins_18A-18D and the address entry select pins_16A-16D, so that the slave devices 14A-14D can have different address sections. For example, the address section select pins_18A and 18C of the slave devices 14A and 14C are coupled to a ground GND, so as to correspond to a first address section. The address entry select pins_16A and 16C are coupled to the ground GND and a power VDD, so as to respectively correspond to the different address entry codes: for example, they may respectively correspond to a first address and a second address of the first address section. Furthermore, the address section select pins_18B and 18D of the slave devices 14B and 14D are coupled to the power VDD, so as to correspond to a second address section. The address entry select pins_16B and 16D are coupled to the ground GND and the power VDD, so as to respectively correspond to the different address entry codes. For example, they may respectively correspond to a first address and a second address of the second address section.

As shown in FIG. 2, the slave devices 14A-14D of the present invention can have the same pin configurations, and the primary slave device and secondary slave device also have the same pin configurations, so that the chip manufacturer can produce the same chips to serve as the slave devices, the primary slave device and the secondary slave device, thereby reducing the cost of the slave device and burden in stock.

The alert handshake pins Alert_1-Alert_4 of the slave devices 14A-14D are electrically connected to the alert-handshake control line ALERT_HAND. In the embodiment, the alert-handshake control line ALERT_HAND is electrically connected to the power VDD through a pull-up resistor R, so that the alert-handshake control line ALERT_HAND is at a high-voltage level (e.g., a high logic signal "H"). Furthermore, the schedule controllers 145A-145D of the slave devices 14A-14D can pull the corresponding alert handshake pins Alert_1-Alert_4 to a low-voltage level (e.g., a low logic signal "L") for driving the alert-handshake control line ALERT_HAND, so that the alert-handshake control line ALERT_HAND is at a low-voltage level. Thus, each of the slave devices 14A-14D can obtain the right to actively communicate with the master device 10 by controlling the voltage level of the alert-handshake control line ALERT_HAND, and also make the other slave devices not respond to the master device 10. The alert handshake pins Alert_1-Alert_4 are the bi-directional input/output (bi-directional input/output) pins, and the alert handshake pins Alert_1-Alert_4 are operating as an open drain in the output mode.

Figure 3:
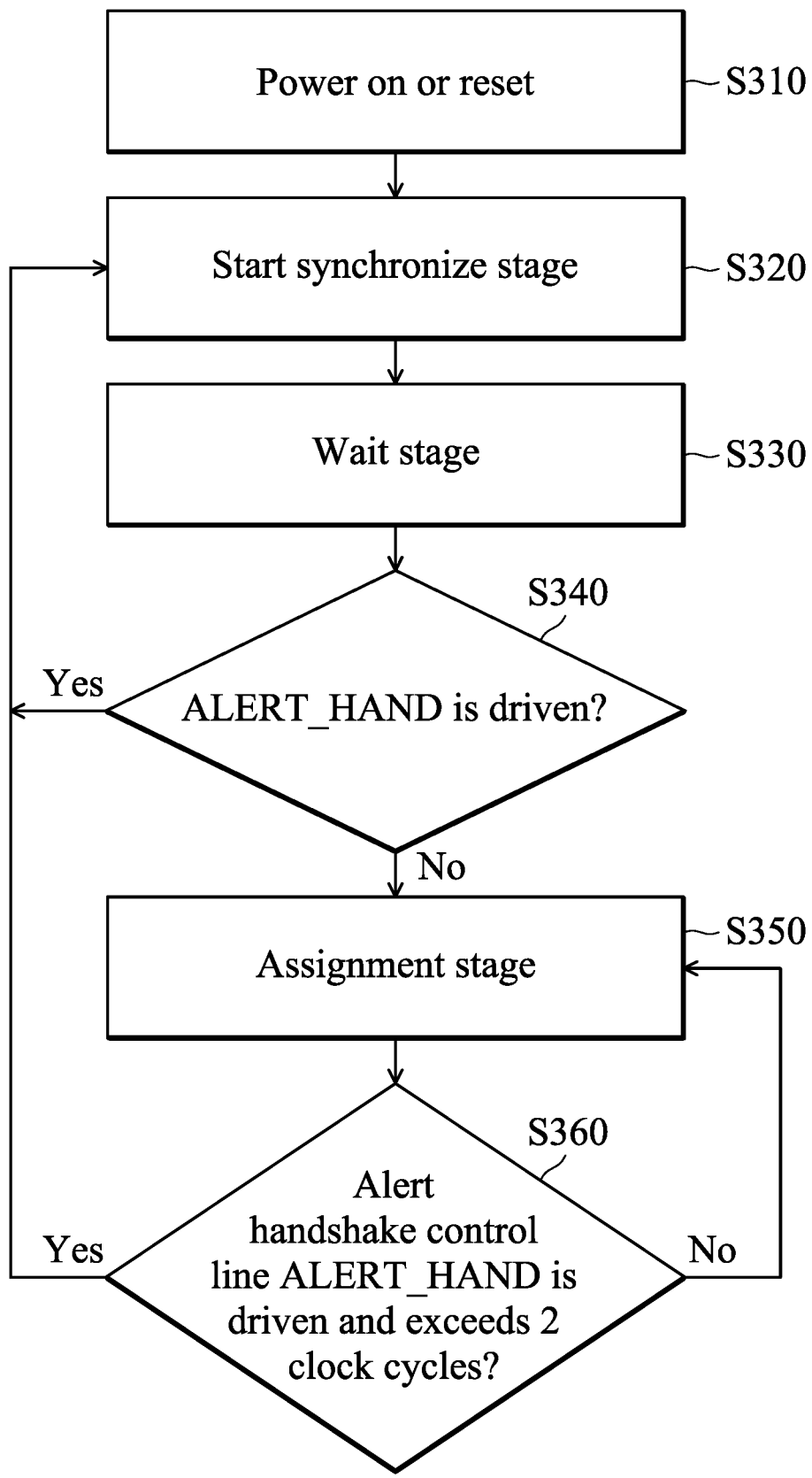
FIG. 3 is a flow chart illustrating a scheduling control method of the bus system according to some embodiments of the invention.
Figure 4:
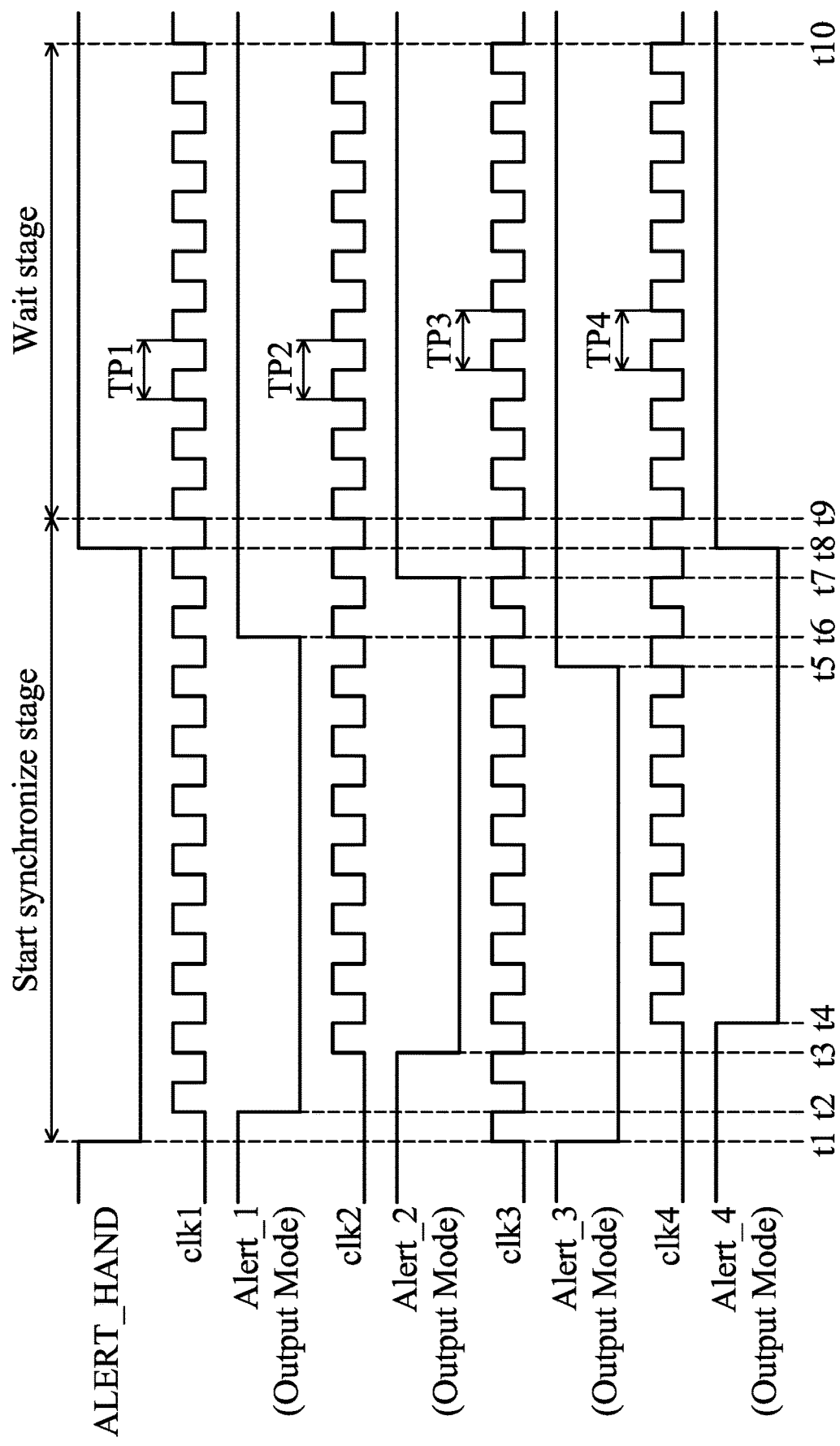
FIG. 4 shows the exemplary signal waveforms of the alert handshake pins Alert_1-Alert_4 of the slave devices 14A-14D and the alert-handshake control line ALERT_HAND to illustrate the operation of the start synchronization stage and of the wait stage in the scheduling control method of FIG. 3.

FIG. 3 is a flow chart illustrating a scheduling control method of the bus system 1 according to some embodiments of the invention. The scheduling control method of FIG. 3 can be performed by each of the schedule controllers 145A-145D of the slave devices 14A-14D in the bus system 1. FIG. 4 shows the exemplary signal waveforms of the alert handshake pins Alert_1-Alert_4 of the slave devices 14A-14D and the alert-handshake control line ALERT_HAND to illustrate the operation of the start synchronization stage and of the wait stage in the scheduling control method of FIG. 3. In addition, the waveforms of the alert handshake pins Alert_1-Alert_4 and the alert-handshake control line ALERT_HAND shown in FIG. 4 are used as an example and are not intended to limit the invention.

Referring to FIGS. 3 and 4 together, the slave devices 14A-14D use the clock signals clk1-clk4 with the same frequency as the counting basis for the schedule controllers 145A-145D. In some embodiments, the clock signals clk1-clk4 are in the same phase. In some embodiments, the clock signals clk1-clk4 have different phases. It should be noted that the clock signals clk1-clk4 have the same frequency, so the clock signals clk1-clk4 have the same time period, i.e., TP1=TP2=TP3=TP4. In some embodiments, the schedule controllers 145A-145D perform the counting operations based on the rising edge of the clock signals clk1-clk4. In some embodiments, the schedule controllers 145A-145D perform the counting operations based on the falling edge of the clock signals clk1-clk4.

When the slave devices 14A-14D are powered on or reset (step S310), the schedule controllers 145-145D control the slave devices 14A-14D to enter the start synchronize stage (step S320). In the start synchronization stage, each of the schedule controllers 145A-145D of the slave devices 14A-14D will pull the corresponding alert handshake pins Alert_1-Alert_4 to a low-voltage level and keep a plurality of clock cycles according to the corresponding clock signals clk1-clk4, so as to inform other slave devices that a start synchronization is required. In the start synchronization stage of FIG. 4, it is assumed that each of the alert handshake pins_1-Alert_4 will be pulled low to a low-voltage level and maintained for 2×4 clock cycles. The number of clock cycles as illustrated is only an example, and the invention is not limited thereto.

In FIG. 4, at time t1, the schedule controller 145C of the slave device 14C controls the alert handshake pin Alert_3 as an output mode and outputs a low-voltage level to drive the alert-handshake control line ALERT_HAND, i.e., the alert-handshake control line ALERT_HAND is controlled to a low-voltage level. Next, at time t2, the schedule controller 145A of the slave device 14A controls the alert handshake pin Alert_1 as an output mode and outputs a low-voltage level to drive the alert-handshake control line ALERT_HAND. Next, at time t3, the schedule controller 145B of the slave device 14B controls the alert handshake pin Alert_2 as an output mode and outputs a low-voltage level to drive the alert-handshake control line ALERT_HAND. Next, at time t4, the schedule controller 145D of the slave device 14D controls the alert handshake pin Alert_4 as an output mode and outputs a low-voltage level to drive the alert-handshake control line ALERT_HAND. In the embodiment, since the slave devices 14A-14D are disposed in different positions on the printed circuit board (PCB) of the bus system 1, when the bus system 1 is turned on or reset, different routings and configurations will cause inconsistencies in the time at which the slave devices 14A-14D enter the start synchronize stage.

At time t5, i.e., after the schedule controller 145C of the slave devices 14C counts 8 clock cycles from time t1, the schedule controller 145C controls the alert handshake pin Alert_3 as an input mode. Thus, the slave device 14C will stop driving the alert-handshake control line ALERT_HAND, and monitor (or detect) the voltage level of the alert-handshake control line ALERT_HAND through the alert handshake pin Alert_3. Next, at time t6, i.e., after the schedule controller 145A of the slave device 14A counts 8 clock cycles from time t2, the schedule controller 145A controls the alert handshake pin Alert_1 as an input mode. Thus, the slave device 14A will stop driving the alert-handshake control line ALERT_HAND and monitor the voltage level of the alert-handshake control line ALERT_HAND through the alert handshake pin Alert_1. Next, at time point t7, i.e., after the schedule controller 145B of the slave device 14B counts 8 clock cycles from time t3, the schedule controller 145B controls the alert handshake pin Alert_2 as an input mode. Thus, the slave device 14B will stop driving the alert-handshake control line ALERT_HAND and monitor the voltage level of the alert-handshake control line ALERT_HAND through the alert handshake pin Alert_2. Next, at time point t8, i.e., after the schedule controller 145D of the slave device 14D counts 8 clock cycles from time t4, the schedule controller 145D controls the alert handshake pin Alert_4 as an input mode. Thus, the slave device 14D will stop driving the alert-handshake control line ALERT_HAND and monitor the voltage level of the alert-handshake control line ALERT_HAND through the alert handshake pin Alert_4.

When the alert-handshake control line ALERT_HAND is not driven by the slave devices 14A-14D, the alert-handshake control line ALERT_HAND will change to a high-voltage level by the pull-up resistor R. Thus, when it is detected that the alert-handshake control line ALERT_HAND is changed from the low-voltage level to the high-voltage level through the alert handshake pins Alert_1-Alert_4, the schedule controllers 145A-145D determine that the start synchronize stage has been completed at time t9, and then the slave devices 14A-14D are controlled by the schedule controllers 145A-145D to enter a wait stage (step S330).

In the wait stage, the schedule controllers 145A-145D monitor whether the alert-handshake control line ALERT_HAND is at a low-voltage level and maintain more than one clock cycle through the alert handshake pins Alert_1-Alert_4 (step S340). If the schedule controllers 145A-145D detect that the alert-handshake control line ALERT_HAND is driven by any of the slave devices 14A-14D during 2×4 clock cycles (e.g., detecting that the alert-handshake control line ALERT_HAND is at a low-voltage level), the schedule controllers 145A-145D will control the slave devices 14A-14D to enter the start synchronize stage (step S320) again. Conversely, if the schedule controllers 145A-145D do not detect that the alert-handshake control line ALERT_HAND is driven during 2×4 clock cycles (e.g., the alert-handshake control line ALERT_HAND remains at a high-voltage level from time t9 to time t10), the schedule controllers 145A-145D control the slave devices 14A-14D to enter an assignment stage (step S350). In the assignment stage, each of the slave devices 14A-14D will monitor the status of the alert-handshake control line ALERT_HAND through the alert handshake pins Alert_1-Alert_4 in each assignment period AP.

Figure 5:
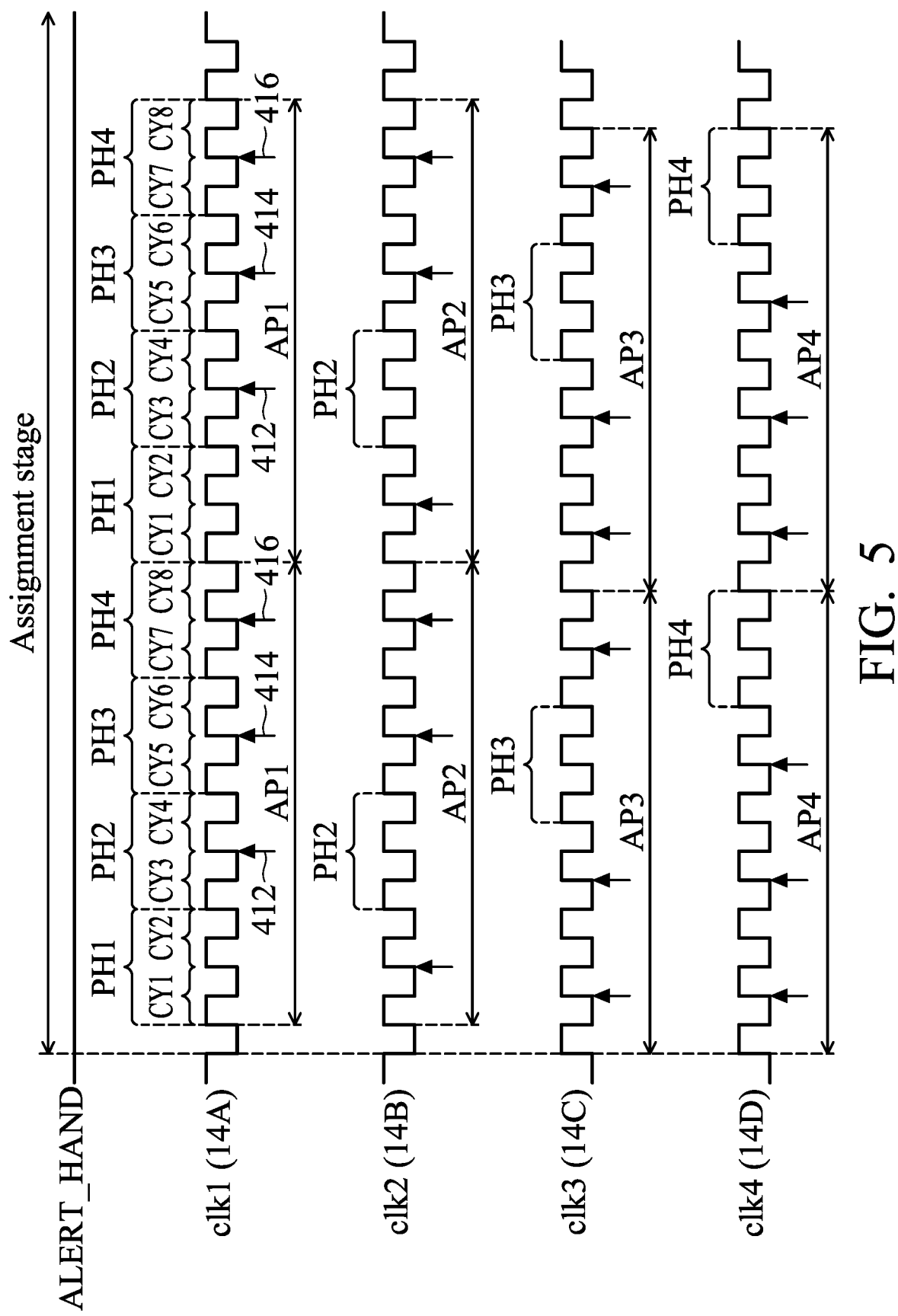
FIG. 5 shows an exemplary waveform of the alert-handshake control line ALERT_HAND to illustrate that the slave devices 14A-14D monitor the alert-handshake control line ALERT_HAND in the assignment stage of the scheduling control method of FIG. 3.

FIG. 5 shows an exemplary waveform of the alert-handshake control line ALERT_HAND illustrating that the slave devices 14A-14D monitor the alert-handshake control line ALERT_HAND in the assignment stage of the scheduling control method of FIG. 3. In FIG. 5, each of the slave devices 14A-14D has assignment periods AP1-AP4 with the same time period. In such embodiments, each of the assignment periods AP1-AP4 has 2×4 clock cycles CY1-CY8. Moreover, each of the assignment periods AP1-AP4 can be divided into four phases PH1-PH4, and each phase includes two clock cycles. For example, the phase PH1 includes the clock cycles CY1 and CY2, the phase PH2 includes the clock cycles CY3 and CY4, the phase PH3 includes the clock cycles CY5 and CY6, and the phase PH4 includes the clock cycles CY7 and CY8.

In FIG. 5, each of the slave devices 14A-14D performs respective operations in accordance with the phases PH1-PH4. In such embodiments, the slave device 14A corresponds to the phase PH1, the slave device 14B corresponds to the phase PH2, the slave device 14C corresponds to the phase PH3, and the slave device 14D corresponds to the phase PH4. In some embodiments, the correspondence between the slave devices 14A-14D and the phases PH1-PH4 is determined by the address segment select pins 18A-18D and the address entry select pins 16A-16D of FIG. 2. In other embodiments, other hardware or software settings may be used to determine the correspondence between the slave devices 14A-14D and the phases PH1-PH4.

In FIG. 5, the slave devices 14A-14D count the clock cycles CY1-CY8 in the assignment periods AP1-AP4 according to the rising edge of the internal clock signals clk1-clk4. In the assignment stage, if the slave device 14A communicates with the master device 10, the slave device 14A can drive the alert-handshake control line ALERT_HAND only during the phase PH1 of the assignment period AP1. Specifically, when the slave device 14A communicates with the master device 10, the schedule controller 145A of the slave device 14A controls the alert handshake pin Alert_1 as an output mode and outputs a low-voltage level in phase PH1, so as to drive the alert-handshake control line ALERT_HAND, i.e., controlling the alert-handshake control line ALERT_HAND to a low-voltage level. If the slave device 14A does not need to communicate with the master device 10, the schedule controller 145A of the slave device 14A will control the alert handshake pin Alert_1 as an input mode in phase PH1, i.e., not driving the alert-handshake control line ALERT_HAND.

In the phases PH2-PH4 of the assignment period AP1, the slave device 14A monitors the voltage level of the alert-handshake control line ALERT_HAND to determine whether the master device 10 communicates with the slave devices 14B-14D. In other words, in the phases PH2-PH4, the schedule controller 145A of the slave device 14A controls the alert handshake pin Alert_1 as the input mode. For example, in the assignment period AP1, the slave device 14A monitors the voltage level of the alert-handshake control line ALERT_HAND through the alert handshake pin Alert_1 in the phase PH2 (as shown by arrow 412), so as to determine whether the slave device 14B communicates with the master device 10. If the slave device 14A detects that the alert-handshake control line ALERT_HAND is at a high-voltage level in the phase PH2, the schedule controller 145A determines that the slave device 14B is not communicating with the master device 10. If the slave device 14A detects that the alert-handshake control line ALERT_HAND is at a low-voltage level in the phase PH2, the schedule controller 145A determines that the slave device 14B is communicating with the master device 10.

Similarly, in the assignment period AP1, the slave device 14A monitors the voltage level of the alert-handshake control line ALERT_HAND through the alert handshake pin Alert_1 in the phase PH3 (as shown by arrow 414), so as to determine whether the slave device 14C communicates with the master device 10. If the slave device 14A detects that the alert-handshake control line ALERT_HAND is at a high-voltage level in the phase PH3, the schedule controller 145A determines that the slave device 14C is not communicating with the master device 10. If the slave device 14A detects that the alert-handshake control line ALERT_HAND is at a low-voltage level in the phase PH3 and the previous phase PH2, the schedule controller 145A determines that the slave device 14C is communicating with the master device 10. If the slave device 14A detects that the alert-handshake control line ALERT_HAND is at a low-voltage level in the phase PH3 and also at a low-voltage level in the previous phase PH2, the schedule controller 145A determines the slave device 14B, 14C or 14D or the other slave device that is newly added (or expanded) is operated in the start synchronize stage. Thus, the slave device 14A performs the start synchronize stage again.

Referring back to FIG. 3, in step S360, each of the slave devices 14A-14D monitors that whether the alert-handshake control line ALERT_HAND is driven more than 2 clock cycles through the corresponding alert handshake pins Alert_1-Alert_4 in each assignment period AP. When any of the slave devices 14A-14D communicates with the master device 10, the slave device will drive the alert-handshake control line ALERT_HAND through the corresponding alert handshake pin, so as to control the alert-handshake control line ALERT_HAND to a low-voltage level and maintain for 2 clock cycles. Therefore, in each assignment period AP, when the schedule controllers 145A-145D monitor that the alert-handshake control line ALERT_HAND is driven for more than 2 clock cycles, the schedule controllers 145A-145D control the slave devices 14A-14D to enter the start synchronize stage again (step S320). Specifically, in each of the assignment periods APs, only one of the slave devices 14A-14D can be allowed to drive the alert-handshake control line ALERT_HAND. Therefore, in each assignment period AP, when the alert-handshake control line ALERT_HAND is driven for more than 2 clock cycles, it indicates that one slave device is operating in the start synchronize stage, thus the other slave devices are also returned to the start synchronize stage.

In some embodiments, the start synchronize stage has the same number of clock cycles as the assignment period. In some embodiments, the start synchronize stage has a different number of clock cycles than the assignment period.

In some embodiments, the wait stage has the same number of clock cycles as the assignment period. In some embodiments, the wait stage has a different number of clock cycles than the assignment period.

In FIG. 5, each of the slave devices 14A-14D can determine which of the slave devices is communicating with the master device 10 by monitoring the phases except for the corresponding phase. Furthermore, by monitoring the rising edge in the middle of each phase, such as the rising edge between the clock cycles CY7 and CY8 (as shown by arrow 416) or the falling edge (not shown), the time difference caused by the phase deviation of the clock signals clk1-clk4 can be avoided.

Figure 6:
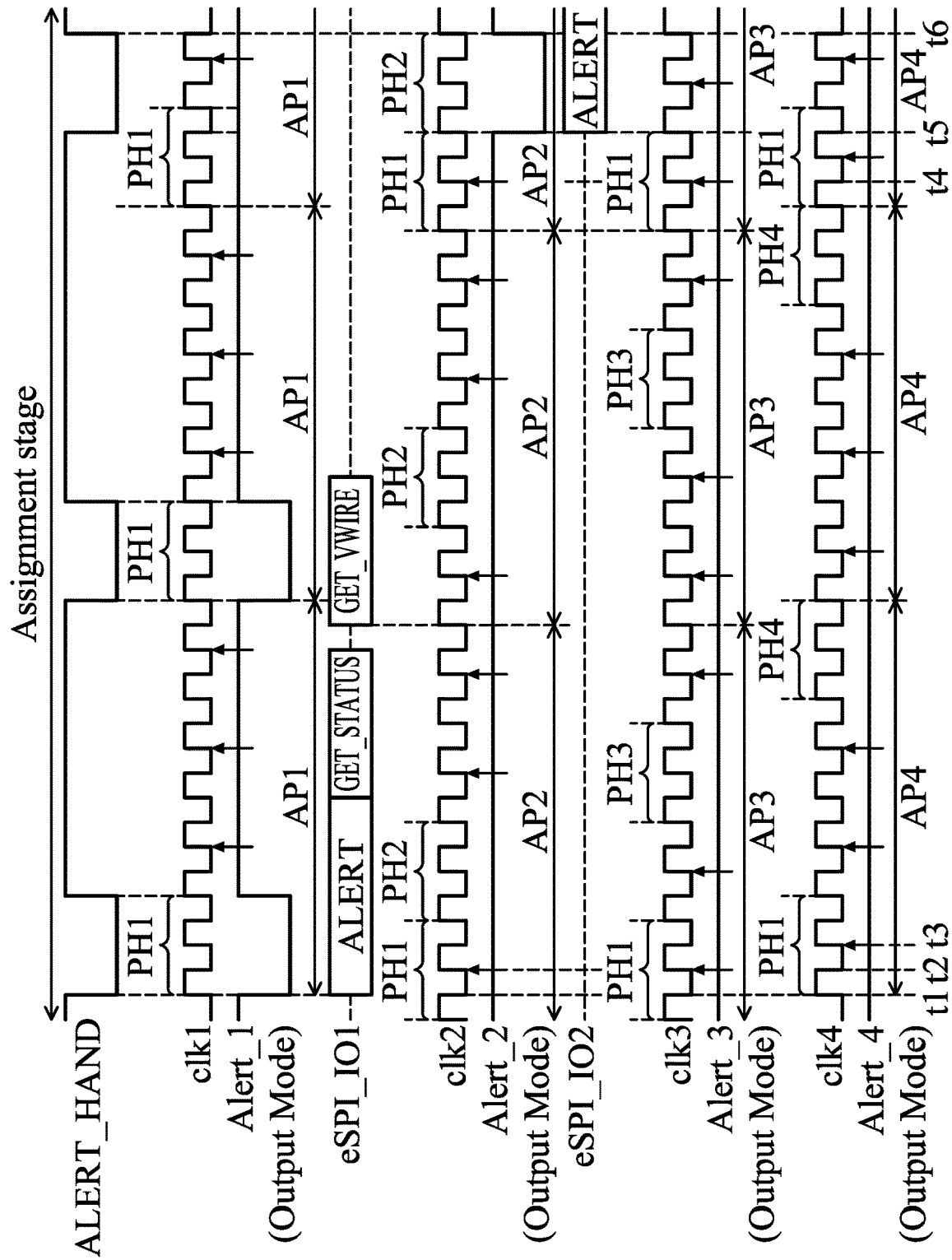
FIG. 6 is an exemplary waveform of the alert-handshake control line ALERT_HAND illustrating that the slave devices 14A-14D are driving the alert-handshake control line ALERT_HAND in the assignment stage of the scheduling control method of FIG. 3.

FIG. 6 is an exemplary waveform of the alert-handshake control line ALERT_HAND illustrating that the slave devices 14A-14D drive the alert-handshake control line ALERT_HAND in the assignment stage of the scheduling control method of FIG. 3. In FIG. 6, before the slave device 14A communicates with the master device 10 (e.g., transmitting interrupt requests), the voltage level of the alert-handshake control line ALERT_HAND is monitored by the slave device 14A, so as to determine that the alert-handshake control line ALERT_HAND is not being driven by the slave devices 14B-14D. Next, at time t1, the slave device 14A controls the alert handshake pin Alert_1 as an output mode and outputs a low-voltage level in its own phase PH1, so as to drive the alert-handshake control line ALERT_HAND. Therefore, the alert-handshake control line ALERT_HAND changes to a low-voltage level during the phase PH1 in the assignment period AP1 of the slave device 14A. Thus, the slave device 14A can obtain the right to communicate with the master device 10. Next, at time t2, the slave device 14B detects that the alert-handshake control line ALERT_HAND is at a low-voltage level in the phase PH1 of the assignment period AP2. Thus, the slave device 14B obtains that the slave device 14A corresponding to phase PH1 is communicating with the master device 10 (e.g., processing the interrupt requests). Simultaneously, the slave device 14C also detects that the alert-handshake control line ALERT_HAND is at a low-voltage level in the phase PH1 of the assignment period AP3. Thus, the slave device 14C detects that the slave device 14A corresponding to phase PH1 is processing the interrupt requests. Next, at time t3, the slave device 14D detects that the alert-handshake control line ALERT_HAND is at a low-voltage level in the phase PH1 of the assignment period AP4. Thus, the slave device 14D detects that the slave device 14A corresponding to the phase PH1 is communicating with the master device 10 (e.g., processing the interrupt requests).

When the slave device 14A is communicating with the master device 10, the slave device 14A provides an event alert signal ALERT to the input and output signal line eSPI_IO of the bus 12 through its input and output signal line eSPI_IO1, so as to transmit the event alert signal ALERT to the master device 10. The event alert signal ALERT is a request signal indicating that the slave device 14A requires communication with the master device 10. When detecting that the alert-handshake control line ALERT_HAND is driven by the slave device 14A, if the other slave devices 14B-14D want to communicate with the master device 10, the event message will be stored until the control of the alert-handshake control line ALERT_HAND is obtained and then communicates with the master device 10.

In response to the event alert signal ALERT, the master device 10 transmits a status-retrieving signal GET_STATUS through the input and output signal line eSPI_IO to query the status of the slave devices 14A-14D. At this time, the slave device 14A will receive the status-retrieving signal GET_STATUS through the input and output signal line eSPI_IO and respond, so as to notify the master device 10 that there is information supposed to be transmitted to the master device 10. At this time, the other slave devices 14B-14D will not receive the status-retrieving signal GET_STATUS and will not respond. Next, the master device 10 transmits an event-retrieving signal GET_VWIRE through the input and output signal line eSPI_IO to retrieve the event information of the slave devices 14A. Next, the slave device 14A receives the event-retrieving signal GET_VWIRE and respond, so as to transmit the event message to the master device 10. The slave devices 14B-14D will not receive the event-retrieving signal GET_VWIRE and also not respond.

When the slave device 14A communicates with the master device 10, the slave device 14A will drive the alert-handshake control line ALERT_HAND in the phase PH1 of each assignment period AP1 until the communication with the master device 10 is completed.

At time t4, the slave device 14B detects that the alert-handshake control line ALERT_HAND changes to a high-voltage level during the phase PH1 of the assignment period AP2. Thus, the slave device 14B obtains that the slave device 14A corresponding to the phase PH1 has completed communication with the master device 10. When the slave device 14B also has an interrupt request, the slave device 14B will control the alert handshake pin Alert_2 as an output mode and output a low-voltage level in its own phase PH2 (e.g., from time t5 to time t6), so as to drive the alert-handshake control line ALERT_HAND. Thus, the slave device 14B will provide the event alert signal ALERT to the input and output signal line eSPI_IO of the bus 12 through its input and output signal line eSPI 102, so as to transmit the event alert signal ALERT to the master device 10 and perform subsequent communication.

In the assignment stage, by using the schedule controller to monitor the voltage level of the alert-handshake control line ALERT_HAND in the phases of each assignment period except for the corresponding phase, the schedule controller can accurately obtain that which slave device is currently communicating with the master device. Thus, the user can identify or the developer can debug faster in the bus system. Moreover, in the assignment period, since each of the slave devices has a corresponding phase, the interrupt requests of different slave devices that may occur at the same time can be staggered in time. Therefore, it is possible to prevent the slave devices from simultaneously occupying and sharing the alert-handshake control line ALERT_HAND, and causing the master device to communicate with the incorrect slave device. Furthermore, the slave devices' own pins (e.g., the address section select pin and the address entry select pin) can be used to set the corresponding phase, thus no additional pins need to be added.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A bus system, comprising:
   a master device;
   a bus; and
   a plurality of slave devices electrically connected to the master device through the bus,
   wherein each of the slave devices has an alert handshake pin, and the alert handshake pins of the slave devices are electrically connected together through an alert-handshake control line,
   wherein when a first slave device of the slave devices communicates with the master device through the bus, in a first phase of a plurality of phases in each assignment period, the first slave device sets the alert-handshake control line to a first voltage level through the alert handshake pin, and in the phases of the assignment period other than the first phase, the alert-handshake control line is at a second voltage level, wherein the first phase corresponds to the first slave device,
   wherein each of the phases comprises two clock cycles.

2. The bus system as claimed in claim 1, wherein the first slave device detects a voltage level of the alert-handshake control line in the phases of the assignment period other than the first phase, so as to determine whether the master device communicates with one of the slave devices.

3. The bus system as claimed in claim 1, wherein when each of the slave devices detects that the alert-handshake control line is at the first voltage level during at least two phases of the assignment period, the slave device sets the alert-handshake control line to the first voltage level through the alert handshake pin in a start synchronization stage.

4. The bus system as claimed in claim 1, wherein in the assignment period, the number of the phases is equal to the number of the slave devices.

5. The bus system as claim in claim 1, further comprising:
   a pull-up resistor coupled to the alert-handshake control line;
   wherein the first voltage level is a low-voltage level, and the second voltage level is a high-voltage level.

6. The bus system as claimed in claim 2, wherein when a second slave device detects that the alert-handshake control line is at the first voltage level in the first phase of the assignment period, the second slave device determines that the master device communicates with the first slave device.

7. The bus system as claimed in claim 3, wherein after the start synchronization stage, the slave devices detect whether the alert-handshake control line remains at the second voltage level in a wait stage.

8. The bus system as claimed in claim 6, wherein when the second slave device detects that the alert-handshake control line is at the second voltage level in the phases of the assignment period, the second slave device determines that the master device does not communicate with the slave devices.

9. The bus system as claimed in claim 7, wherein after the wait stage, each of the slave devices detects a voltage level of the alert-handshake control line in the phases of the assignment period except for the corresponding phase, to determine whether the master device communicates with one of the slave devices.

10. A bus system, comprising:
a master device;
a bus; and
a plurality of slave devices electrically connected to the master device through the bus,
wherein each of the slave devices has an alert handshake pin, and the alert handshake pins of the slave devices are electrically connected together through an alert-handshake control line without connecting to the master device,
wherein each of the slave devices detects a voltage level of the alert-handshake control line in a plurality of phases of each assignment period except for the corresponding phase, to determine whether the master device communicates with one of the slave devices,
wherein in the assignment period, the number of the phases is equal to the number of the slave devices.

11. The bus system as claim in claim 10, wherein when a first slave device of the slave devices communicates with the master device through the bus, in a first phase corresponding to the first slave device of the assignment period, the first slave device drives the alert-handshake control line through the alert handshake pin, such that the alert-handshake control line is at a first voltage level, so as to notify the other slave devices that the master device is communicating with the first slave device.

12. The bus system as claimed in claim 10, wherein when each of the slave devices detects that the alert-handshake control line is at a first voltage level during at least two of the phases of the assignment period, the slave device controls the alert-handshake control line at the first voltage level through the alert handshake pin in a start synchronization stage.

13. The bus system as claimed in claim 12, wherein after the start synchronization stage, the slave devices detect whether the alert-handshake control line remains at a second voltage level in a wait stage.

14. The bus system as claim in claim 11, wherein in the phases of the assignment period except for the first phase, the alert-handshake control line is at a second voltage level, wherein each of the phases comprises two clock cycles.

15. The bus system as claimed in claim 11, wherein when a second slave device of the slave devices detects that the alert-handshake control line is at the first voltage level in the first phase of the assignment period, the second slave device determines that the master device communicates with the first slave device.

16. The bus system as claim in claim 13, further comprising:
a pull-up resistor coupled to the alert-handshake control line;
wherein the first voltage level is a low-voltage level, and the second voltage level is a high-voltage level.

17. The bus system as claimed in claim 15, wherein when the second slave device detects that the alert-handshake control line is at a second voltage level in the phases of the assignment period, the second slave device determines that the master device does not communicate with the slave devices.

18. The bus system as claimed in claim 16, wherein after the wait stage, each of the slave devices detects the voltage level of the alert-handshake control line in the phases of the assignment period except for the corresponding phase, to determine whether the master device communicates with the one of the slave devices.

19. The bus system as claimed in claim 16, wherein when the slave device detects that the alert-handshake control line is at the first voltage level in the wait stage, the slave device enters the start synchronization stage again, so as to control the alert-handshake control line to the first voltage level through the alert handshake pin.

\* \* \* \* \*